United States Patent Office 3,494,223
Patented Feb. 10, 1970

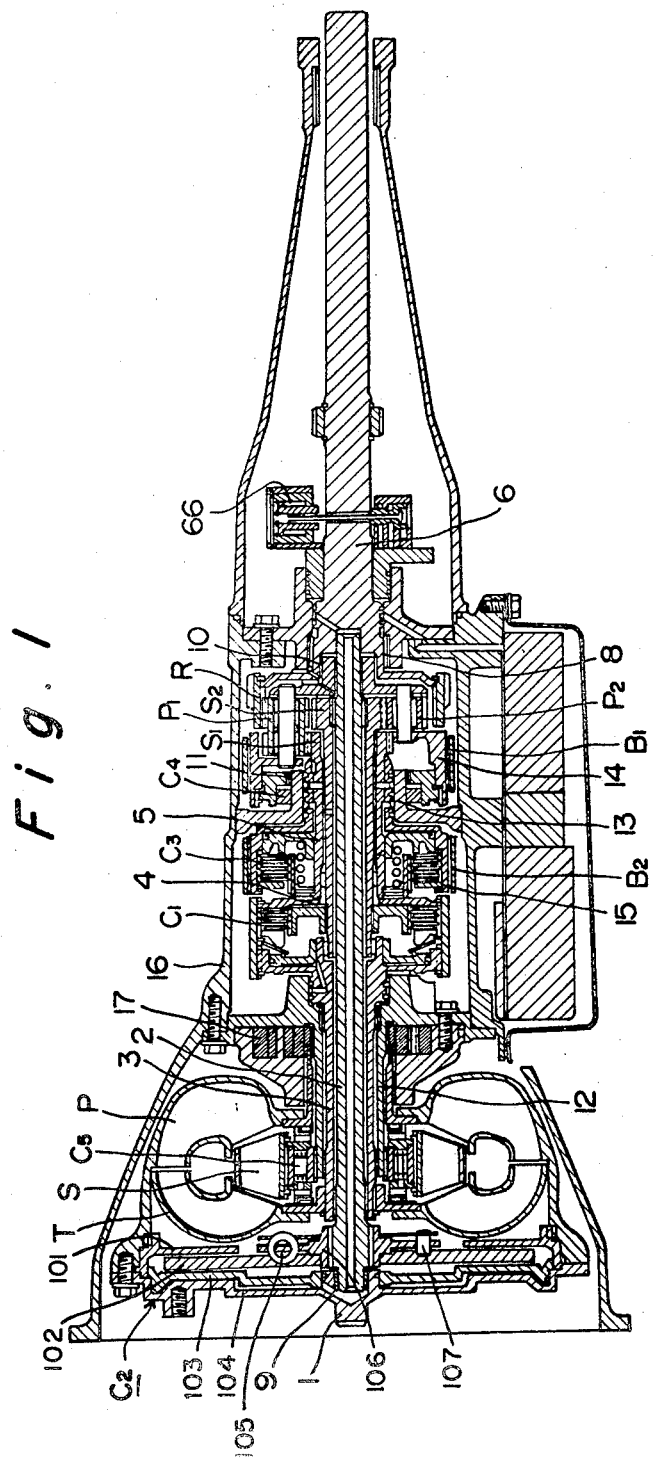

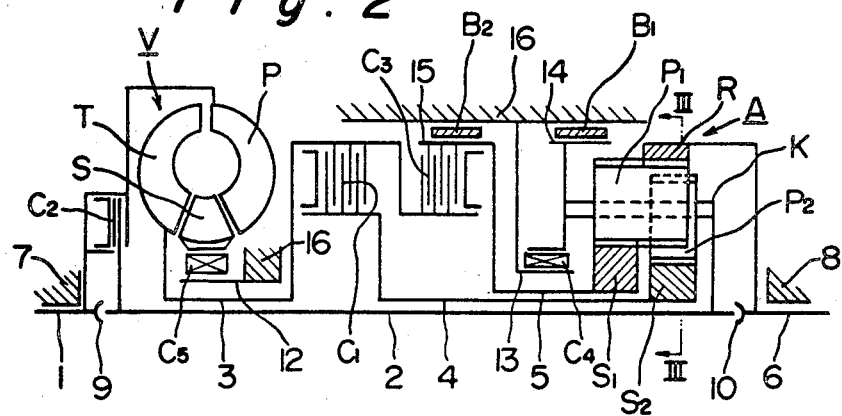
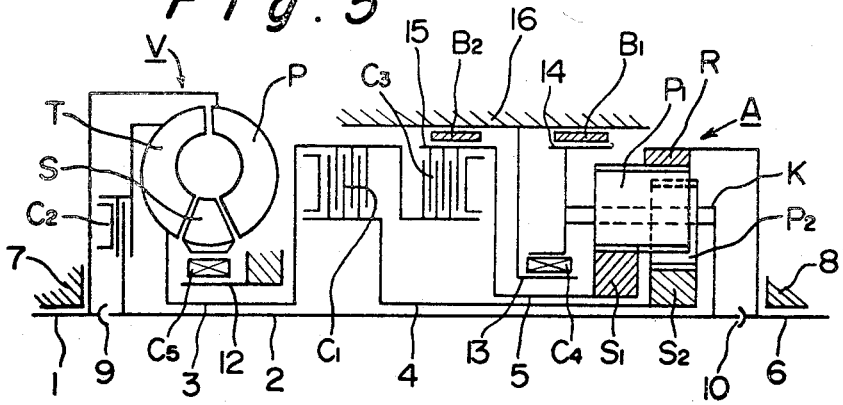
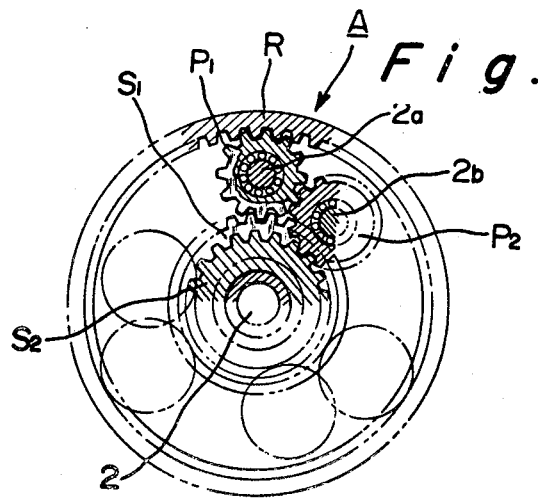

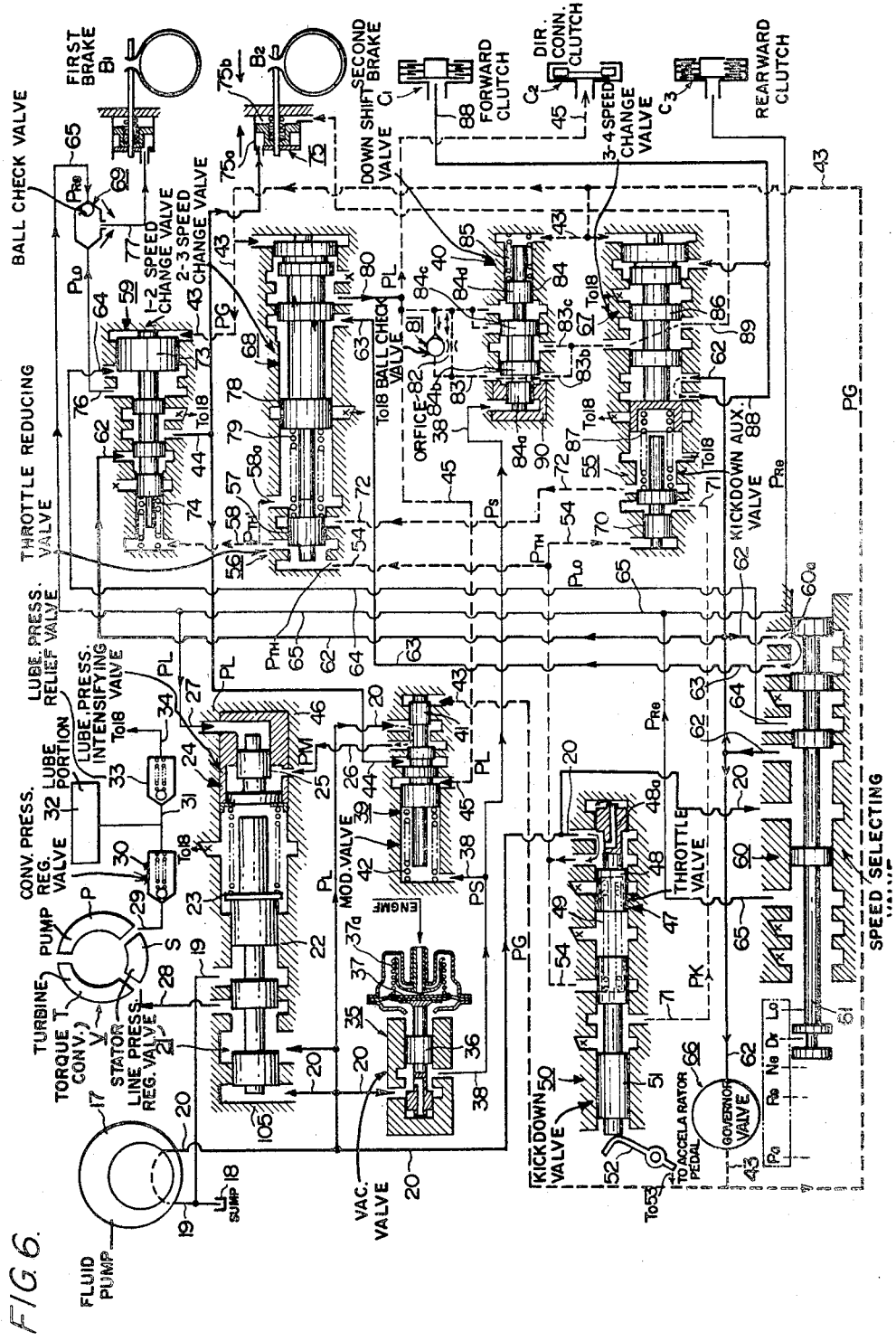

3,494,223
HYDRAULICALLY CONTROLLED AUTOMATIC SPEED CHANGE DEVICE
Yoichi Mori, Yokohama, Japan, assignor to Nissan Jidosha Kabushiki Kaisha, Yokohama, Japan
Filed May 12, 1967, Ser. No. 638,036
Claims priority, application Japan, May 19, 1966, 41/31,494; Mar. 31, 1967, 42/19,870
Int. Cl. F16h 57/10, 47/08
U.S. Cl. 74—688         7 Claims

ABSTRACT OF THE DISCLOSURE

An automatic speed change device comprising an input shaft, a torque converter, a hydraulic control means, and a planetary gear assembly having a first sun gear connected to said converter through a rearward clutch and engageable with a second brake, a second sun gear connected to said converter through a forward clutch, an internal gear connected to an output gear, and a carrier engageable with a first brake and connected to said converter through a direct connection clutch, thereby the output gear is driven at four speed change stages by actuating said clutches and brakes by said hydraulic control means.

---

This invention relates to an automatic speed change device, more particularly an automatic speed change device of hydraulic control type having excellent operative characteristics, such as a continuous speed change ratio over a considerably wide range, which comprises, in combination, a casing, an input and an output shaft means, a torque converter, various shaft means, a planetary gear assembly, various clutch means, and various brake means.

An object of the invention is to provide a hydraulically controlled automatic speed change device of simplified construction capable of changing forward speed in four stages and rearward speed in a single stage.

Another object of the invention is to provide a hydraulically controlled automatic speed change device of very simple construction and yet capable of effecting so-called over drive for revolving an output shaft thereof at a speed higher than that of the input shaft thereof, when the speed change device is operated at the fourth stage thereof.

Automatic speed change devices capable of overspeed drive have been known in the prior art utilizing a torque converter and planetary gearing assemblies. However, such conventional automatic speed change devices have a number of disadvantages. In shift operations from a second stage, or a forward intermediate speed drive ratio, to a third stage, or direct drive ratio, a special combination of brake and one-way brake have heretofore been required. Such special combinations make the speed change device complicated and expensive to manufacture. It is therefore an object of this invention to provide a simple and efficient speed change device capable of carrying out shift operations from the second stage to the third stage of operation without any provision of a special combination of brake and one-way brake. Furthermore, in the speed change devices of the prior art, a direct connection clutch is disposed between an intermediate shaft bonded directly with the engine output shaft and the planetary gear assembly. Such arrangements of the direct connection clutch results in serious shortcomings which have been overcome by the present invention.

The present invention provides an intermediate shaft separated from the engine output shaft but bonded to the planetary gear assembly. Thus, the direct drive clutch can be mounted between the torque converter and the intermediate shaft, where much more space is available than in the proximity of the planetary gear assembly. This further allows the direct drive clutch to be designed so as to have a large diameter in order to improve its heat dissipating properties for insuring a high dependability of the clutch and, due to the increased size, improved shock absorbing qualities. Furthermore, according to the preferred embodiment of the present invention, the direct drive clutch can be connected to the turbine of the torque converter mounted at one end of the engine output shaft so that the mechanical shock caused by the operation of engagement and disengagement of the clutch is effectively absorbed by the torque converter, thus improving the operative characteristics of the speed change device and insuring a high degree of dependability.

A further object of the present invention is to provide a hydraulically controlled automatic speed change device of the aforesaid type, which is controlled by a hydraulic means including a modulator valve for controlling the device at a most suitable hydraulic pressure.

It is another object of the present invention to provide an automatic speed change device of the preceding type including a hydraulic control means having a down-shift valve for providing a proper neutral interval for each down-shift operation from one speed change stage to a next lower stage.

An object of the present invention is to provide an automatic four stage speed change device controlled by a hydraulic means including a 3–4-stage speed change valve.

According to the present invention, there is provided a hydraulically controlled automatic speed change device, which comprises a casing, an input shaft means rotatable only in one direction, an output shaft means, a torque converter having a pump connected to said input shaft means and a turbine connected through a shaft means to a clutch assembly including a forward and a rearward clutch, a planetary gear assembly, and a hydraulic control means, said planetary gear assembly consisting of a first sun gear connected to a shaft engageable with said turbine through the rearward clutch and with a second brake carried by the casing, a second sun gear connected to a shaft engageable with said turbine through the forward clutch, a plurality of first planet gears engaged with said first sun gear, a plurality of second planet gears each engaged with one of said first planet gears and with said second sun gear, an internal gear connected to said output shaft means and engaged with said first planet gears, and a carrier holding said first and second planet gears, said carrier being supported by a bearing means and a one-way brake both carried by stationary sleeve secured to said casing so as to be rotatable only in said one direction and connected to a shaft engageable with a certain portion of the torque converter through a direct connection clutch and with a brake carried by the casing.

For a better understanding of the invention, reference is made to the accompanying drawings, in which:

FIG. 1 is a longitudinal sectional view of an automatic speed change device embodying the present invention;

FIG. 2 is a skeleton diagram, showing, in a greatly simplified sectional view, one half of the automatic speed change device as illustrated in FIG. 1;

FIG. 3 is an end view taken substantially on the line II—III of FIG. 2, showing, in a greatly simplified form, the manner in which various gears are engaged each other in a planetary gear assembly usable in the device of FIG. 2;

FIG. 5 is a skeleton diagram similar to FIG. 2, showing, in a greatly simplified sectional view, one half of another embodiment of the present invention;

FIG. 6 is a schematic system diagram of a hydraulic control means usable in the automatic speed change device according to the present invention.

The same elements and parts in different embodiments of the invention are represented by the same reference numerals and symbols throughout the accompanying drawings.

Figure 4A:
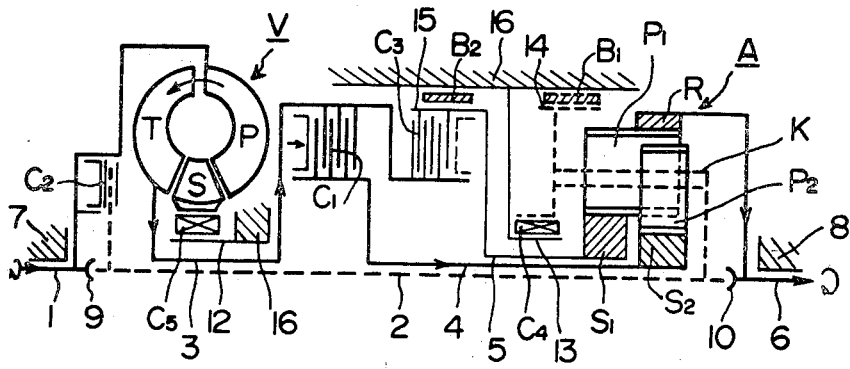
FIGS. 4a to 4e are diagrammatic illustrations showing the manner in which various elements of the device of FIG. 2 are actuated in the first, second, third, and fourth forward operative stages, and in the rearward operative stage thereof, respectively.
Figure 4B:
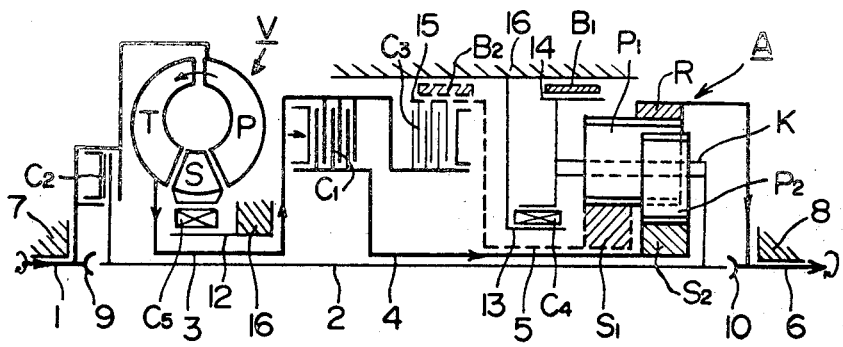
Figure 4C:
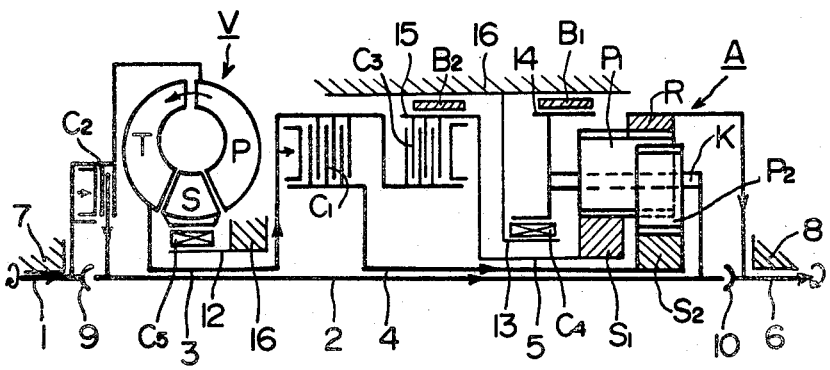
Figure 4D:
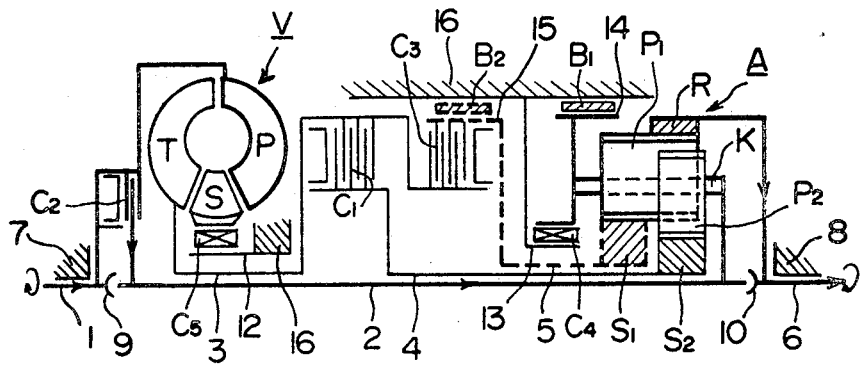
Figure 4E:
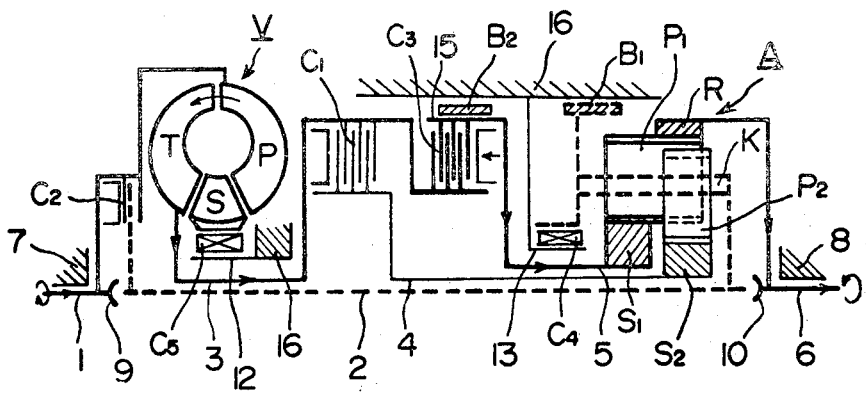

Since the speed change device of the invention is substantially symmetrical with respect to the axial center line thereof, only one half of each speed change device above the axial center line thereof is illustrated in sectional views of FIGS. 2, 4a to 4e, and 5 for the sake of simplicity.

(I) SPEED CHANGE DEVICE

Referring to FIGS. 1 to 3, illustrating an embodiment of the present invention, there are provided an input shaft 1 rotatable only in one direction, and intermediate shaft 2, an output shaft 6, and three tubular shafts, namely a first, a second, and a third tubular shaft 3, 4 and 5. An input shaft bearing 7 and an output shaft bearing 8 are secured to a casing 16 so as to support the input and output shafts 1 and 6 respectively. The intermediate shaft 2 is supported by bearings 9 and 10 secured to the input and output shafts 1 and 6, so that the intermediate shaft 2 can be rotated independent of the movement of the input and output shafts 1 and 6. The first and second tubular shafts 3 and 4 are slidably fitted on the intermediate shaft 2 so as to be rotatable around the intermediate shaft 2 in a coaxial manner, and the third tubular shaft 5 is slidably fitted on the second tubular shaft 4 so as to be rotatable around the latter in a coaxial manner. A torque converter V, including a pump P, a turbine T, and a stator S, is mounted at the front portion of the speed change device in the proximity of the input shaft 1. The pump P is directly connected to the input shaft 1, and the turbine T is connected to the tubular shaft 3, while the stator S is adapted to be rotatable around a front stationary sleeve 12 through a second one-way brake $C_5$. The front stationary sleeve 12 is formed as an integral part of the casing 16. The second one-way brake $C_5$ is adapted to allow rotation of the stator S only in one direction, which is the same as that of the revolution of the input shaft and the pump P, but the second brake $C_5$ hampers rotation of the stator S in a direction opposite to the forementioned one direction.

In this particular embodiment of the invention, a planetary gear assembly A is mounted at the rear portion of the speed change device in the proximity of the output shaft 6, and the assembly A comprises a first sun gear $S_1$ secured to the third tubular shaft 5, a second sun gear $S_2$ secured to the second tubular shaft 4, three first planet gears $P_1$, three second planet gears $P_2$, an internal gear R, and a carrier K holding the first and the second planet gears $P_1$ and $P_2$ in a rotatable manner. FIG. 3 illustrates an arrangement of various gears of the planetary gear assembly A. The first sun gear $S_1$ is engaged with all the first planet gears $P_1$, and second sun gear $S_2$ is engaged with all the second planet gears $P_2$, while each first planet gear $P_1$ is engaged with both an adjacent second planet gear $P_2$ and the internal gear R simultaneously. The carrier K comprises a rear member connected to the intermediate shaft 2 so as to be rotated together with the shaft 2 as a unit, a front member supported by a bearing means 11 (FIG. 1) and a first one-way brake $C_4$ by a rear stationary sleeve 13 on the casing 16 so as to be rotatable in the one direction only, and six shaft members, comprising three shafts 2a of the first planet gears $P_1$ and three shafts 2b of the second planet gears $P_2$, extending between the front and rear members in parallel with the intermediate shaft 2 so as to support six planet gears $P_1$ and $P_2$ respectively in a rotatable manner. The rear stationary sleeve 13 is formed as an integral part of the casing 16, and the first one-way brake $C_4$ allows rotation of the carrier K only in the one direction, but hampers rotation of the same in a direction opposite to the one direction.

There are provided clutches and brakes controllable automatically by means of a hydraulic system to be described later. A forward clutch $C_1$ is inserted between the first and the second tubular shafts 3 and 4 so as to control the connection between the turbine T and the second sun gear $S_2$, while a rearward clutch $C_3$ is inserted between the first and the third tubular shafts 3 and 5 so as to control the connection between the turbine T and the first sun gear $S_1$. In this embodiment, a direct connection clutch $C_2$ is inserted between the input and the intermediate shafts 1 and 2 so as to control the connection between the pump P and the carrier K.

In order to insure the smooth operation of the direct drive clutch $C_2$, it is preferable to provide a reaction plate 101, a clutch disc 102 to be pressed against the reaction plate by a pressure plate 103 when hydraulic pressure is applied to the cavity 104, and a clutch hub 106 splined to the intermediate shaft 2 at the central portion thereof and engaged with the reaction plate 101 through a pin 107 associated with torsion springs 105. With such structure of the direct connection clutch $C_2$, the rate of heat dissipation from the clutch can be kept high to insure a high dependability. The pin 107 and the torsion springs 105 inserted between the reaction plate 101 and the hub 106 act to absorb torsional shocks during the operation by compression and expansion of the torsion springs 105. The detailed arrangement of the pin and torsion springs are known to those skilled in the art and will not be repeated here. A first brake $B_1$ is inserted between the casing 16 and a drum member 14 formed on the front member of the carrier K as an integral part thereof, thereby the movement of the carirer K with respect to the casing 16 can be directly controlled by regulating the first brake $B_1$. A second brake $B_2$ is inserted between the casing 16 and a drum member 15 formed on the front side of the third tubular shaft 5 as an integral part thereof, thereby the movement of the first sun gear $S_1$ with respect to the casing 16 can be directly controlled by regulating the second brake $B_2$.

In the speed change device as described in the foregoing, referring to FIGS. 1 to 3, when the input shaft 1 is rotated by a driving means (not shown), the pump P directly connected to the input shaft 1 is rotated to effect rotation of the turbine T by fluid which is filled in the pump, turbine T, and the stator S. The revolving speed of the output shaft 6 can be changed automatically by automatic control of the clutches $C_1$, $C_2$, $C_3$, and brakes $B_1$, $B_2$. Table I illustrates the operative conditions of each clutch and each brake of the speed change device for various speed change stages thereof.

TABLE I

| Speed change stage | Forward clutch (C₁) | Direct connection clutch (C₂) | Rearward clutch (C₃) | First brake (B₁) | Second brake (B₂) | First one-way brake (C₄) |
|---|---|---|---|---|---|---|
| Neutral | — | — | — | — | — | — |
| Forward, first | O | — | — | ◐ | — | O |
| Forward, second | O | — | — | — | O | — |
| Forward, third | O | O | — | — | — | — |
| Forward, fourth | — | O | — | — | O | — |
| Rearward | — | — | O | O | — | — |

In Table I, the symbol O means that a clutch is engaged, that a brake is actuated, or that a one-way brake is automatically locked, and the symbol — designates that a clutch is disengaged, that a brake is released, or that a one-way brake is not locked. The symbol ◐ designates that the first brake $B_1$ is actuated when engine brake is applied with the speed change device operated at the forward first stage.

A speed change ratio to be used hereinafter is defined by a quotient of (revolving speed of the turbine T)/(revolving speed of the output shaft 6).

The mechanism of power transmission in each speed change stage of the device of the invention will now be described in conjunction with the speed change ratio therein. There are following relations between the revolving speeds $N_{s1}$, $N_{s2}$, $N_r$ and $N_K$ of the first sun gear $S_1$, the second sun gear $S_2$, the internal gear R, and the carrier K.

$$N_K(l_R+1) = N_{s1} + N_R l_R \quad (1)$$

$$N_K(l_S+1) = N_{s1} + N_{s2} l_S \quad (2)$$

Here, $$l_S = \frac{\text{number of teeth of the second sun gear } S_2}{\text{number of teeth of the first sun gear } S_1}$$

$$= \frac{\text{radius of pitch circle of the second sun gear } S_2}{\text{radius of pitch circle of the first sun gear } S_1}$$

$$l_R = \frac{\text{number of teeth of the internal gear } R}{\text{number of teeth of the first sun gear } S_1}$$

$$= \frac{\text{radius of pitch circle of the internal gear } R}{\text{radius of pitch circle of the first sun gear } S_1}$$

FIG. 4 illustrates the routes through which power is transmitted from the input shaft 1 to the output shaft 6 in each speed change stage of the device, as shown in FIGS. 1 to 3. In FIG. 4, those portions of the device which are actuated are shown by thick solid lines, those portions held stationary by heavy dotted lines, and the remainder by thin solid lines.

Operative conditions of the device in each speed change stage will now be described in further detail.

Neutral stage: The clutches $C_1$, $C_2$, and $C_3$ are all disengaged and the brakes $B_1$ and $B_2$ are released. Thereby, even when the input shaft 1 is rotated, the device is not actuated except for idling operation of the pump P directly connected to the input shaft 1, the turbine T actuated by the pump P, and the first tubular shaft 3 directly connected to the turbine T.

First speed change stage (FIG. 4a): The forward clutch $C_1$ is engaged. Then, the power of the input shaft 1 is transmitted to the pump P to rotate it, and the turbine T thus actuated by the pump P acts to transmit the power to the second sun gear $S_2$ through a path comprising the first tubular shaft 3, the forward clutch $C_1$, and the second tubular shaft 4. Then, the carrier K is urged in a direction opposite to the one direction by the reactional force acting on the output shaft 6, but the carrier K is held stationary by the first one-way brake $C_4$ which acts to hamper the rotation of the carrier K in such opposite direction. Accordingly, the internal gear R is rotated at a reduced speed, as will be described hereinafter, for rotating the output shaft 6 secured thereto at the same reduced speed. By substituting $N_K=0$ to the Formulae 1 and 2, the speed change ratio M for this forward first stake is determined as follows.

$$M = \frac{N_{s2}}{N_R} = \frac{l_R}{l_S}$$

When engine brake is applied, for instance for the purpose of controlling the travelling speed of an automobile while descending along a slope, there is produced such a torque on the output shaft 6 which tends to accelerate rotation of the carrier K in the one direction. Since the first one-way brake $C_4$ is not effective in hindering the rotation of the carrier in the one direction, in order to make the engine brake effective, it is preferable to actuate the first brake $B_1$ and withhold the carrier K securely. Thus, the desired engine brake can be applied while maintaining the aforementioned speed change ratio.

Second speed change stage (FIG. 4b): The forward clutch $C_1$ is engaged and the second brake $B_2$ is actuated simultaneously. Then, as in the case of the first speed change stage, the power of the input shaft 1 is transmitted to the second sun gear $S_2$ through a path consisting of the pump P, the turbine T, the first tubular shaft 3, the forward clutch $C_1$, and the second tubular shaft 4. Since the second brake $B_2$ is actuated in this stage of operation, the first sun gear $S_1$ is held stationary by means of the drum member 15 and the third tubular shaft 5. Thus, the internal gear R is rotated at a reduced speed, and hence, the output shaft 6 secured to the internal gear R is rotated at the same reduced speed. By substituting $N_{s1}=0$ to the Formulae 1 and 2, the speed change ratio M for this forward second stage can be determined as follows.

$$M = \frac{N_{s2}}{N_R} = \frac{l_R(l_S+1)}{l_S(l_R+1)}$$

Third speed change stage (FIG. 4c): Both the forward clutch $C_1$ and the direct connection clutch $C_2$ are engaged simultaneously. Then, as in the case of the preceding first and second speed change stages, the power of the input shaft 1 is transmitted to the second sun gear $S_2$ through a path comprising the pump P, the turbine T, the first tubular shaft 3, the forward clutch $C_1$, and the second tubular shaft 4. At the same time, the same power is transmitted to the carrier K through the direct connection clutch $C_2$ and the intermediate shaft 2. In this case, the torque converter V is in a so-called coupled condition, and the pump P, the turbine T, and the stator S are all rotated together as if they were an integral body, and hence, the second sun gear $S_2$ is rotated at a speed, which is substantially the same as that of the carrier K or the input shaft 1. Thereby, all the movable members of the planetary gear assembly A are also rotated at the same speed as if they were an integral body. Accordingly, the output shaft 6 secured to the internal gear R is rotated at the same speed as that of the input shaft 1, and it is apparent that the speed change ratio M for this forward third stage is substantially a unity or $M \doteq 1$.

Fourth speed change stage (FIG. 4d): The direct connection clutch $C_2$ is engaged, and at the same time the second brake $B_2$ is actuated. Under these conditions, the torque converter V idles as in the case of the aforementioned neutral stage, and the power of the input shaft 1 is mechanically transmitted to the carrier K through a path comprising the direct connection clutch $C_2$ and the intermediate shaft 2. Actuation of the second brake $B_2$ results in holding the first sun gear $S_1$ stationary by means of the drum member 15 and the third tubular shaft 5. Accordingly, the internal gear R is rotated at an increased speed, as will be described hereinafter, and hence, the output shaft 6 secured to the internal gear R is also rotated at the same increased speed. Thus, so-called over drive is achieved. In this case, the speed change ratio M for the fourth forward stage can be determined as follows by substituting $N_{s1}=0$ to the Formula 1.

$$M = \frac{N_K}{N_R} = \frac{l_R}{l_R+1}$$

Rearward stage (FIG. 4e): The rearward clutch $C_3$ is engaged, and at the same time, the first brake $B_1$ is actuated. Then, the power of the input shaft 1 is transmitted to the first sun gear $S_1$ through a path comprising the pump P, the turbine T, the first tubular shaft 3, and the rearward clutch $C_3$, while the carrier K is kept stationary by the first brake $B_1$ as described in the foregoing. Thereby the internal gear R is rotated in a reverse direction at a reduced speed, as will be described hereinafter, thereby the output shaft 6 secured to the internal gear R is rotated in a reverse direction at the same reduced speed as that of the internal gear R. The speed change ratio M for this rearward stage can be determined as follows by substituting $N_K=0$ to the Formula 1.

$$M = \frac{N_{s1}}{N_R} = -l_R$$

The speed change ratio M of the device of the invention can be preselected so as to meet specific needs of various automotive vehicles by selecting proper gear ratios $l_S$ and $l_R$. Two typical examples are shown in Table II.

TABLE II

|  | Example 1, $l_R=2.1$, $l_S=0.88$ | Example 2, $l_R=2.6$, $l_S=0.88$ |
| --- | --- | --- |
| Forward, first stage | M=2.39 | M=2.96 |
| Forward, second stage | 1.45 | 1.54 |
| Forward, third stage | 1 | 1 |
| Forward, fourth stage | 0.68 | 0.72 |
| Rearward | −2.10 | −2.60 |

It is apparent to those skilled in the art that a speed change device of Example 1 of Table II is suitable for a passenger car, while that of Example 2 for a bus or a truck.

FIG. 5 illustrates another embodiment of the speed change device according to the present invention. This embodiment is different from the preceding embodiment described hereinbefore referring to FIGS. 1 to 3 in that a direct connection clutch $C_2$ is inserted between a turbine T and an intermediate shaft 2. The remaining parts of the device of FIG. 5 are the same as those of the preceding embodiment. This embodiment can be operated in the same manner as the preceding embodiment by controlling the engagement of various clutches $C_1$ to $C_3$ and actuation of brakes $B_1$ and $B_2$ in the same manner as those shown in Table I. In the case of the preceding embodiment, the direct connection clutch $C_2$ is inserted between the input shaft 1 and the intermediate shaft 2, or between the pump P and the intermediate shaft 2, thereby, in the forward third stage of operation thereof, the power of the input shaft 1 is transmitted in the form of two torques, i.e. a torque mechanically transmitted and another torque transmitted through the torque converter V, and furthermore, in the case of the forward fourth stage thereof, the power of the input shaft is transmitted mechanically without passing through the torque converter V. On the other hand, in this embodiment, as shown in FIG. 5, the direct connection clutch $C_2$ is separated from an input shaft 1 and a pump P, and it is inserted between the turbine T and the intermediate shaft 2, and accordingly, in both the forward third and fourth stages of the device of FIG. 5, the power is transmitted through the torque converter V, but not directly from the input shaft itself. Thus, the power transmission can be done very smoothly.

It is apparent that the speed change ratios of the embodiment of FIG. 5 for various speed change stages thereof are the same as those of the preceding embodiment described hereinbefore referring to FIGS. 1 to 3.

(II) HYDRAULIC CONTROL CIRCUIT

The overall construction of the hydraulic control circuit will now be described.

In FIG. 6, the operative hydraulic pressure for the clutches $C_1$, $C_2$, $C_3$, the brakes $B_1$, $B_2$, and the torque converter V is supplied from a fluid pump 17 to be driven by the pump P of the torque converter, which is in turn secured to the crankshaft 1, and the lubricating fluid for each part of the speed change device can be also distributed through the device by means of the fluid pump 17. As long as the engine is running, the fluid in a sump 18 located at the bottom of a transmission case is sucked by the fluid pump 17 through a suction port on the transmission case leading to a fluid passageway 19 after being separated from harmful dust particles. The output from the fluid pump is discharged to a passage 20 acting as the source of operating fluid pressure of various parts of the speed change device. A line pressure regulating valve 21 is provided to regulate the fluid pressure of passage 20 at a certain level. The line pressure regulating valve 21 consists of a spool 22 and a spring 23. The spool 22 is subjected to the elastic force of the spring 23, a modulator pressure $P_M$ (to be described hereinafter) on another passage 26 applied through the spool 25 of a line pressure intensifying valve 24, and a line pressure $P_L$ (to be described hereinafter) on a passage 27. The composite pressure of the aforesaid three pressures balances the line pressure applied to the extreme left end surface of the spool 22 through the passage 20.

The operative fluid pressure for the torque converter V is delivered thereto from the passage 20 through the line pressure regulating valve 21 and a passage 28, and the fluid pressure is retained at a certain level by means of a converter pressure retaining valve 30 through a passage 29. Upon increase of the fluid pressure in excess of a certain value, the converter fluid pressure retaining valve 30 is opened and the fluid is further fed to a lubricating portion 32 through a passage 31. If the lubricating fluid pressure is increased beyond a certain limit, a lubrication relief valve 33 is opened to return the fluid to the sump 18 through a passage 34 for reducing the pressure.

A vacuum valve 35 is connected to a vacuum diaphragm 37 through a spool 36. The vacuum diaphragm 37 is communicated with an engine intake manifold. The passage 20 is communicated with the vacuum valve 35, so as to produce a throttle pressure $P_S$ on a passage 38 responsive to the pressure at the engine intake manifold. The passage 38 is communicated with both a modulator valve 39 and a down-shift valve 40.

The modulator valve 39 consists of a spool 41 and a spring 42, and a composite pressure of the elastic force of the spring 42 and another force due to the vacuum throttle pressure $P_S$ on the passage 38 acts on the spool 41 from the left hand end thereof. A modulator pressure $P_M$ to be delivered on passage 26 is a balance between the aforesaid composite pressure acting on the left hand end of the spool 41 and a total pressure acting thereon, which total pressure consisting of the line pressure $P_L$ on the passage 20, a governor pressure $P_G$ (to be described hereinafter) on a passage 43, and the line pressure $P_L$ on passages 45 and 44. The modulator pressure $P_M$ is delivered to the spool 25 of the line pressure intensifying valve 24 through a sleeve 46 of the valve 24.

A throttle valve 47 comprises a spool 48 and a spring 49, and connected to the spool 51 of a kick-down valve 50 through the spring 49. The kickdown valve 50 comprises the spool 51 and its left hand end is connected to an accelerator pedal (not shown) through a lever 52 and an engine throttle cable 53. The line pressure $P_L$ is delivered to the throttle valve 47, and a fluid pressure responsive to the degree of opening of the engine throttle or the elastic force of the spring 49 is delivered to a passage 54.

The passage 54 of the throttle valve 47 is communicated with the kick-down valve 50 and a kick-down auxiliary valve 55 and a throttle reducing valve 56. The throttle reducing valve 56 comprises a spool 57 to reduce the throttle pressure $P_{TH}$ on the passage 54, and the pressure thus reduced is applied to a port 58a so as to be combined with the elastic force of a spring 79 of a 2-3 stage speed change valve 68, so that the pressure on the passage 54 can be reduced in response to the elastic force of the spring 79 and delivered on the passage 58. The reduced throttle pressure is delivered to a 1-2 stage speed change valve 59 through the passage 58.

A speed selecting valve 60 comprises only a spool 61 but comprises no spring, and the valve 60 acts to deliver the line pressure $P_L$ on the passage 20 to any of passages 62, 63, 64, and 65 responsive to the selected operative position of the spool 61. The passage 62 is communicated with a 3-4 stage speed change valve 67 and a governor valve 66. The passage 63 is communicated with the 2-3 stage speed change valve 68.

The passage 64 is communicated with the 1-2 stage speed change valve 59. The passage 65 is communicated with the rearward clutch $C_3$, the line pressure intensifying valve 24, and a ball-check valve 69.

The kick-down auxiliary valve 55 comprises a spool 70 and acts to feed the kick-down pressure $P_K$ from the passage 71 to the 2-3 stage speed change valve 68 through a passage 72. The pressure of the kick-down auxiliary valve 55 is for effecting the down-shift between the 3-2 stages later than the down-shift between the 4-3 stages.

The governor valve 66 is secured to the output shaft 6 of the speed change device, and during the forward operation, the valve 66 generates the governor pressure $P_G$ on the passage 43 responsive to the revolving speed of the output shaft 6, and the pressure $P_G$ is converted from the line pressure on passage 62 delivered through the speed selecting valve 60. The governor pressure $P_G$ thus generated on the passage 43 is fed to the modulator valve 39, the 3-4 stage speed change valve 67, the down-shift valve 40, the 2-3 stage speed change valve 68, and the 1-2 stage speed change valve 59.

The 1-2 stage speed change valve 59 comprises a spool 73 and a spring 74. The line pressure passages 62 and 64 and the governor pressure passage 43 and the reduced throttle pressure $P_{TH'}$ passage 58 are connected to the valve 59, while the valve 59 is communicated with the modulator valve 39 and the actuating side 75a of an actuator valve 75 for the second brake $B_2$ through the passage 44 and with the ball-check valve 69 through a passage 76.

The ball-check valve 69 is a two-position valve, which blocks the passageway from the passage 76 and communicates the passage 65 with the passage 77, provided that a pressure is applied from the passage 65. On the other hand, if a pressure is applied thereto from the passage 76, the valve 69 communicates the passage 76 with the passage 77.

The 2-3 stage speed change valve 68 comprises a spool 78 and a spring 79, and it is connected to the line pressure passage 63, the reduced throttle pressure passage 58 through the port 58a, and the governor pressure passage 43. The speed change valve 68 is communicated through the passage 80 with the direct connection clutch $C_2$ and the modulator valve 39, a one-way-check ball valve 81, an orifice 82, and the down-shift valve 40.

The one-way-check ball valve 81 is adapted to allow communication of fluid from the passage 80 to the passage 83 with substantially no resistance while blocking the fluid flow in the opposite direction from the line 83 to the line 80 by means of a ball.

The down-shift valve 40 comprises a spool 84 and a spring 85, and it is connected to the line pressure passage 80, the vacuum throttle pressure passage 38, and the governor pressure passage 43. The valve 40 is communicated through the passage 83 with the one-way-check ball valve 81, the orifice 82, and the 3-4 stage speed change valve 67.

The 3-4 stage speed change valve 67 comprises a spool 86 and a spring 87, and it is connected to the line pressure passage 62, and the governor pressure passage 43. The valve 67 is communicated through the passage 88 with the forward clutch $C_1$, through the passage 89 with the release side 75b of the actuator 75 for the second brake $B_2$, and through the passage 83 to the down-shift valve 40 having a sleeve 90.

(III) OPERATION OF EACH FRICTIONAL ELEMENT

The frictional elements usable in the speed change device according to the present invention, which comprise the first brake $B_1$, the second brake $B_2$, the forward clutch $C_1$, the direct connection clutch $C_2$, and the rearward clutch $C_3$, are communicated with the speed change valves or the speed selecting valve as described in the foregoing referring to FIG. 6.

FIG. 6 shows the conditions of various valves when the speed selecting valve 60 is set at the operative position $Dr$. The line pressure on the passage 20 is delivered to the passage 62 and to the governor valve 66. Under those conditions, the line pressure is also applied to the forward clutch $C_1$ through the 3-4 stage speed change valve 67 and the passage 88. The passage 62 is connected to the 1-2 stage speed change valve 59 too.

At the same time the 2-3 stage speed change valve 68 is connected to the passage 63, which is communicated with a port 60a of the valve 60 leading to the passage 62. Thereby, the line pressure $P_L$ on the passage 62 is delivered to the valve 68.

The operation of the hydraulic control means of FIG. 6 under various operative stages will now be described.

(1) $Dr$ position (1) *Forward first stage.*—When the running speed of the automobile equipped with the speed change device of the present invention is very slow, the governor pressure $P_G$ on the passage 43 generated by the governor valve 66 is weak, and the spools of the 1-2 stage speed change valve 59, the 2-3 stage speed change valve 68, and the 3-4 stage speed change valve 67 are forced to the extreme right end positions thereof by the elastic force of the springs 74, 79, and 87 respectively. Thus, only the passage 88 is communicated with the passage 20 to actuate only the forward clutch $C_1$. The clutch $C_1$ cooperates with the one-way brake $C_4$ described in the foregoing to run the speed change device at the forward first stage.

(2) *Forward second stage.*—As the automobile speed is increased from that of the first stage, the governor pressure $P_G$ on the passage 43 is so intensified as to overcome the elastic force of the spring 74 of the 1-2 stage speed change valve 59 to force the spool 73 leftwards. The construction of the 2-3 stage speed change valve 68 and the 3-4 stage speed change valve 67 is such that the operative positions of the spools 78 and 86 thereof are substantially unchanged. Thus, the passage 62 is communicated with the passage 44 to actuate the second brake $B_2$ by delivering the fluid pressure to the actuating side 75a of the actuator valve 75. Thereby the forward clutch $C_1$ is engaged and the second brake $B_2$ is actuated to run the speed change device at the second stage.

(3) *Forward third stage.*—As the automobile speed is further increased, the governor pressure $P_G$ on the passage 43 is so intensified as to overcome the elastic force of the spring 79 of the 2-3 stage speed change valve 68 for shifting the spool 78 thereof leftwards. Thus, the passage 63 is communicated with the passage 80 to deliver the line pressure $P_L$ to the direct connection clutch $C_2$. At the same time, the line pressure $P_L$ is also applied to the release side $75b$ of the actuator valve 75 for the second brake $B_2$ through the one-way-check ball valve 81, the passage 83, and the 3–4 stage speed change valve 67 leading to the passage 89, so that the second brake $B_2$ is released. The actuator valve 75 for the brake $B_2$ has an applying (or actuating) side $75a$ and a release side $75b$, and when the fluid pressure is applied to both sides, the brake $B_2$ is released by the elasticity of a spring incorporated therein. In other words, in the third stage of operation, the brake $B_2$ is released. At this moment, the spool 86 of the 3–4 stage speed change valve 67 is held substantially at the position shown in FIG. 6. Thereby, the forward clutch $C_1$ and the direct connection clutch $C_2$ are engaged, and the speed change device is operated at the forward third stage.

(4) *Forward fourth stage.*—When the automobile speed is still further increased to intensify the governor pressure $P_G$ so as to overcome the elastic force of the spring 87 of the 3–4 stage speed change valve 67 for forcing the spool 86 leftwards. Thus, the communication between the passages 62 and 88 is interrupted, and the fluid on the passage 88 is drained to the sump 18 to diminish the pressure on the forward clutch $C_1$. The communication between the passages 83 and 89 is also interrupted, and the fluid which applies pressure on the release side $75b$ of the actuator valve 75 for the second brake $B_2$ is drained to the sump 18, and the pressure on the releasing side is diminished. Thereby, the direct connection clutch $C_2$ is engaged and the second brake $B_2$ is actuated to operate the speed change device at the forward fourth stage.

(2) Lo position

When the speed selecting valve 60 is set at the Lo position, the passage 20 is communicated with the passage 62 and the line pressure $P_L$ is delivered to the governor valve 66 and to the forward clutch $C_1$ through the 3–4 stage speed change valve 67. At the same time, the passage 62 is communicated to the 1–2 stage speed change valve 59 as indicated in the figure.

With the speed selecting valve 60 at the Lo position, the passage 20 is communicated with the passage 64, which leads to the 1–2 stage speed change valve 59, and if the speed change device is then run at the first stage, the line pressure $P_L$ is applied to the first brake $B_1$ through the passage 76 and the ball-check valve 69.

Thus, if the speed change device of the invention is run at the first stage when the speed selecting valve is set at the Lo position, the forward clutch $C_1$ is engaged and the first brake $B_1$ is actuated to apply engine brake. Under these conditions, the passages 64 and 76 are communicated each other, and a fluid force is applied on the spool 73 of the 1–2 stage speed change valve 59 in a direction to reinforce the spring 74 but against the governor pressure $P_G$. Thus, the upshift under these conditions is effected at a higher automobile running speed than that in the case with the speed selecting valve 60 set at the Dr position.

When the speed change device is operated at any operative stage with the speed selecting valve 60 set at the Dr position, if the operative position of the speed selecting valve 60 is shifted from the Dr position to the Lo position, then the speed change device will be operated at either second or first speed change stage depending mainly on the automobile speed at the moment of said shifting.

(3) Re position

When the speed selecting valve 60 is set at the Re position the passage 20 is communicated with the passage 65 to deliver the line pressure $P_L$ to the rearward clutch $C_3$ and to the low brake $B_1$ through the ball-check valve 69 and the passage 77. Thereby, the rearward clutch $C_3$ is engaged and the low brake $B_1$ is actuated to operate the speed change device at the rearward stage.

(4) Ne and Pa positions

If the speed selecting valve is set at either Ne or Pa position, the passage 20 is not communicated with any of the outgoing passages, and hence, none of the friction element is actuated.

The operation of the hydraulic control means according to the present invention will now be described.

When the speed change device is operated forwardly with the speed selecting valve 60 set at the Dr or Lo position, in the line pressure regulating valve 21, the composite pressure of the elastic force of the spring 23 and the modulator pressure $P_M$ applied to the spool 25 of the line pressure intensifying valve 24 through the passage 26 balances the line pressure $P_L$ applied to the valve 21 against said composite force, so that the line pressure of the passage 20 is controlled by the modulator pressure on the passage 26.

The modulator pressure on the passage 26 is generated by the modulator valve 39. In the modulator valve 39, a combined pressure of the elastic force of the spring 42 and the vacuum throttle pressure $P_S$ on the passage 38 balances a total force of the governor pressure $P_G$ added with the modulator pressure $P_M$.

Figure 7:
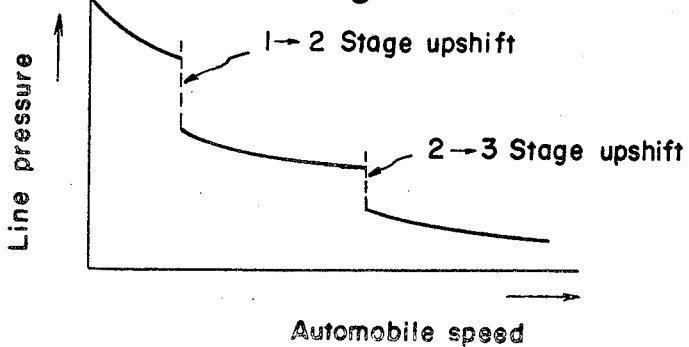
FIG. 7 is a graph illustrating the relationship between line pressure of the hydraulic control means of FIG. 6 and the running speed of an automobile equipped with the control means.

When the automobile speed is increased and the speed change device is upshifted to the second stage, the line pressure is applied to the modulator valve 39 at the passage 44. If the automobile speed is further increased to run the speed change device at the third stage, the line pressure is applied to the valve 39 at the passage 45. In other words, at the first stage of operation, the modulator pressure is determined by the vacuum throttle pressure on the passage 38, the governor pressure on the passage 43, and the elastic force of the spring 42, and the modulator pressure thus determined is applied to the spool 25 of the line pressure intensifying valve 24 to intensify the line pressure accordingly. When the automobile speed is increased to run the speed change device at the second stage, the line pressure is applied to the modulator valve 39 at the passage 44 against the elastic force of the spring 42, and accordingly, the modulator pressure is reduced. Thereby, the line pressure is lowered to a level suitable for the second stage operation. When the automobile speed is further increased to run the speed change device at the third stage, the line pressure is applied to the modulator valve 39 at the passage 45 against the elastic force of the spring 42, so that the spool 41 is urged leftwards for reducing the modulator pressure on the passage 26. Thereby, the line pressure is further lowered to another level suitable for the third stage operation. Thus, the capacity of each frictional element can be selected independently during the shifting of operative stages, so that the shock due to such shifting of the operating stages is considerably reduced and the driving loss of the fluid pump can be minimized. FIG. 7 shows the relationship between the automobile speed and the line pressure as described in the foregoing.

The operation of the down-shift valve 40 will now be described.

In shifting from the third to the second operating stage, there should be a certain duration of neutral interval from the disengagement of the direct connection clutch $C_2$ to the actuation of the second brake $B_2$, so that the revolving speed of the engine can be increased to a level suitable for the second stage operation before the second brake is actuated. Such neutral interval can be achieved by providing a time lag from the draining of the pressure on the second brake release passage 89 through the passage 80 until the draining of the pressure on the direct connection clutch $C_2$ through the passage 80, which time lag corresponds to a length of the desired neutral interval.

The duration of the aforesaid neutral interval should be short when the engine driving torque is large or the engine intake manifold's negative pressure is low, while the duration should be long when the automobile speed is high. The down-shift valve 40 is provided for this purpose. The down-shift valve 40 comprises a spool 84, a spring 85, and a sleeve 90. The release pressure of the second brake $B_2$ is applied to the down-shift valve 40 so as to urge the spool 84 rightwards against the spring 85, through the passage 89, the 3–4 stage speed change valve 67, and the passage 83b or 83c. The fluid on the passage 83 can be fed into the passage 80 through the orifice portion 82. On the other hand, the fluid in the line 80 is communicated with the down-shift valve 40 to urge the spool 84 leftwards in conjunction with the spring 85.

Moreover, the vacuum throttle pressure $P_S$ is also applied to the down-shift valve 40 through the passage 38, and said pressure $P_S$ acts against the spring 85. On the other hand, the governor pressure $P_G$ is applied thereto through the passage 43 so as to reinforce the spring 85 by urging the spool leftwards. The differential pressure between the passages 83 and 80 is determined by the three pressures, namely the elastic force of the spring 85, the vacuum throttle pressure $P_S$ on the passage 38, and the governor pressure on the passage 43. If the automobile speed preceding the down-shift is in excess of a certain level, upon the drainage of the fluid pressure from the passage 80 to the sump through the 2–3 stage speed change valve 68, the fluid on the passage 83 is drained at a slow rate through the orifice 82. Thus, the drainage of the released pressure of the second brake $B_2$ is delayed from the drainage of the pressure of the direct connection clutch $C_2$ by the period corresponding to the differential pressure between the passages 83 and 80 during the down-shift, depending on the automobile speed preceding the down-shift operation. The down-shift operation can thus be carried out smoothly.

In the process of the up-shift from the second stage to the third stage, the one-way-check ball valve 81 is opened, and the presence of the down-shift valve does not affect the aforesaid up-shift operation at all.

(IV) OPERATION OF VARIOUS VALVES

The operation of individual valves will now be described in further detail.

(1) Line pressure regulating valve 21

This valve comprises a spool having three lands, and the object of this valve is to regulate the line pressure so as to provide the most suitable pressure to friction elements, such as brakes and clutches, during running of the speed change device. The spring 23 forces the spool 22 leftwards from the righthand end thereof. The fluid pressure generated by the fluid pump 17 on the passage 20 is applied to the extreme left end of the spool 22 so as to urge the spool rightwards against the spring 23.

If the fluid pressure generated by the fluid pump surpasses the elastic force of the spring 23, the spool 22 is moved rightwards. In this case, the fluid supplied to the passage 20 by the fluid pump 17 is delivered to the hydraulic torque converter V through the passage 28. If the fluid pressure is further increased, the fluid is drained to the sump 18 through the passage 19, and the output pressure of the fluid pump is reduced.

On the contrary, if the spring force is larger than the fluid pressure, the spool 22 is moved leftwards to close the passage 19 for maintaining the discharge pressure of the fluid pump 17 to a certain increased level.

Thus, the fluid pressure on the passage 20 is controlled by moving the spool 22 so as to place the middle land thereof opposite to the passage 19. In other words, the spring force and the fluid pressure on the passage 20 are balanced so as to maintain the fluid pressure on the passage 20 at a certain desired level.

(2) Line pressure intensifying valve 24

The line pressure intensifying valve 24 comprises a spool 25 having two lands and a body 46 surrounding the spool, and the object of the valve 24 is to facilitate the intensification of the line pressure. The movement of the right hand end of the sleeve 25 is limited by the body of the valve 24, while the spring 23 of the line pressure regulating valve 21 urges the spool 25 rightwards from the extreme left end thereof. When the line pressure regulating valve 21 is at the regulated position, the spool 22 of the line pressure regulating valve 21 is kept in contact with the spool 25 of the line pressure intensifying valve 24.

The reverse pressure $P_{Re}$ is applied to the line pressure intensifying valve 24 at the passage 27 thereof, so that during the reverse operation, the reverse pressure $P_{Re}$ urges the spool 25 leftwards to apply a leftward force to the spool 22 of the line pressure regulating valve 21. Such leftward force acting on the spool 22 corresponds to an increase in the elastic force of the spring 23. Thus, the fluid pressure on the passage 20 to balance the spring force is increased correspondingly.

The modulator pressure is also applied to the line pressure intensifying valve 24 at the passage 26 so as to increase the line pressure when the modulator pressure is high.

(3) Vacuum valve 35

This vacuum valve comprises a spool 36 having two lands, and the right hand end of the spool 36 is connected directly to a diaphragm 37 so as to control the vacuum throttle pressure responsive to the variation on the engine manifold vacuum pressure. The line pressure on the passage 20 is applied to the valve 35 and delivered between two lands of the spool 36, and the fluid pressure between the two lands becomes the vacuum throttle pressure. At the same time, this vacuum throttle pressure is applied to the left hand end of the vacuum valve 35 through a small passageway bored through the spool 36, so as to urge the spool 36 rightwards against the rightward pressure of the diaphragm 37. When the spool is moved rightwards, the left hand side land closes the passage 20, and the vacuum throttle pressure is decreased in the same manner as the line pressure regulating valve; namely, the vacuum throttle pressure is increased until the pressure acting at the left hand end of the spool 36 is so increased as to move the spool 36 rightwards and to balance the diaphragm pressure.

The vacuum diaphragm 37 comprises two chambers, of which the right hand chamber is communicated with the negative pressure at the engine intake manifold while the left hand chamber thereof is opened to the atmosphere. There is provided a spring 37a in the right hand chamber communicated with the negative pressure. The spring 37a is normally kept as compressed, so that when there is no appreciable negative pressure in the engine intake manifold, the spring 37a acts to urge the spool 36 leftwards, and the vacuum throttle pressure is increased to balance thus increased spring force.

When negative pressure is generated in the engine intake manifold, such negative pressure is applied to the vacuum diaphragm 37 so as to reduce the effective elastic force of the spring 37a. Thus, as the absolute value of the negative pressure at the engine intake manifold is increased, the spool 36 is pulled rightwards against the elastic force of the spring 37a, and the vacuum throttle pressure is also reduced correspondingly.

In other words, with this vacuum valve, when the engine torque is large, the absolute value of the negative pressure becomes small and the force urging the spool 36 leftwards becomes large and the vacuum throttle pressure also becomes large.

(4) Modulator valve 39

This modulator comprises a spool 41 having four lands and a spring 42, and the object of this valve 39 is to control the line pressure at a proper level responsive to the automobile speed and the variation in the engine torque by using the line pressure, vacuum throttle pressure, a pressure on the passage 44 leading to the brake $B_2$ for controlling the second stage operation, and a pressure on the passage 45 leading to the direct connection clutch C₂ for controlling the third and fourth stage operation.

The basic operative principles of this valve 39 are identical with those of the vacuum valve 35, and the line pressure applied thereto through the passage 20 is communicated to the passage 26.

Due to the difference in the cross sectional area between the extreme right land and the land next to the extreme right, the spool 41 is urged leftwards against the spring 42 to block the opening of the passage 20 to the valve 39.

In addition, the governor pressure $P_G$ is applied to the extreme right end of the spool 41, and when the automobile speed is high, the governor pressure is high to effect an apparent reduction of the elastic force of the spring 42. Thus, when the automobile speed is high, both the modulator pressure $P_M$ and the line pressure $P_L$ are low.

Furthermore, the passage 44 delivers to the valve 39 a particular pressure available only during the second and fourth stage operation, while the passage 45 delivers to the valve 39 another particular pressure available only during the third and fourth stage operation. Thereby, the spool 41 is urged leftwards responsive to such particular pressures, and the modulator pressure $P_M$ is reduced accordingly.

Moreover, the vacuum throttle pressure $P_S$ is applied to the extreme left end of the spool 41, and when the vacuum throttle pressure is high, the apparent elastic force of the spring 42 is increased to raise the modulator pressure $P_M$.

The relation between the line and modulator pressures and the operative conditions of the automobile is shown in the following table.

|  | Automobile speed | | Engine torque | |
| --- | --- | --- | --- | --- |
|  | High | Low | High | Low |
| Governor pressure | High | Low | | |
| Negative pressure at engine intake manifold (absolute value) | | | Low | High |
| Vacuum throttle pressure | | | High | Low |
| Modulator pressure | Low | High | do | Low |
| Line pressure | Low | do | do | Low |

(5) Throttle valve 47

This throttle valve 47 comprises a spool 48 having two lands, which spool is associated with the kick-down valve 50 through a spring 49 so as to cooperate with the kick-down valve 50 for regulating the throttle pressure responsive to the degree of opening of the accelerator throttle or the accelerator pedal position. The line pressure is applied through the passage 20 to the intermediate space between the two lands of the spool 48, and the throttle pressure to be delivered to the passage 54 is applied to the extreme right end of the spool through a passageway 48a bored through the spool 48 for urging the spool leftwards. The magnitude of the throttle pressure is determined by the balance of the elastic force of the spring 49 acting on the left hand end of the spool 48 and the pressure acting on the right hand end of the spool 48.

The spring 49 is associated with the accelerator through the lever 52 engaged with the left hand end of the spool 51 of the kick-down valve 50 and the engine throttle cable 53. When the accelerator pedal (not shown) is depressed, the spool 51 of the valve 50 is urged rightwards to compress the spring 49 for intensifying the throttle pressure on the passage 54.

(6) Kick-down valve 50

This valve is to produce the kick-down pressure $P_K$ when the accelerator pedal is depressed in excess of a certain degree. The kick-down valve 50 is located in front of the throttle valve 47, as described in the preceding paragraph. Upon application of kick-down or depression of the accelerator pedestal in excess of said certain degree, the passage 54 is communicated with the passage 71, and a kick-down pressure $P_K$ is delivered on the passage 71 from the throttle pressure on the passage 54.

(7) Kick-down auxiliary valve 55

This kick-down auxiliary valve is to facilitate sequential kick-down operation in the order of fourth-third-second-first stages. The kick-down pressure $P_K$ generated at the kick-down valve 50 is at first delivered to the kick-down auxiliary valve 55. If a kick-down takes place when the speed change device is run at the fourth stage, due to the fact that the spool 70 of the kick-down auxiliary valve 55 is kept at the extreme left position during the fourth stage operation, the passage 71 is not communicated with the passage 72, and the kick-down pressure $P_K$ is not delivered thereto. However, the kick-down pressure $P_K$ is applied to the space between the two lands of the spool 70 to urge it rightwards thanks to the difference in the sectional area of the two lands. As the spool 70 is shifted rightwards, the spool 86 of the 3-4 stage speed change valve 67 is also moved rightwards to carry out the shift from the fourth to third stage of operation of the speed change device. When the spool 70 is fully moved rightwards, the passage 72 is communicated with the passage 71 and the kick-down pressure $P_K$ is delivered to the 2-3 stage speed change valve 68 through the passage 72. During the third stage of operation, the spool 57 of the throttle reducing valve 56 is kept at the extreme left position thereof, and the pressure on the passage 72 is delivered into the chamber where the spring 79 is located. Thereby, the spool 78 of the 2-3 stage speed change valve 68 is moved rightwards to carry out shift from the third to the second stage of operation.

The kick-down pressure $P_K$ is then delivered to the 1-2 stage speed change valve 59 through the passage 58 to move the spool 73 thereof rightwards to carry out the shift from the second to the first stage of operation. The selection of the operative position in the sequence of the fourth-third-second-first stage of operation is determined by the throttle pressure and the automobile speed or the governor pressure.

(8) Throttle reducing valve 56

This throttle reducing valve 56 is adapted to be operated in conjunction with the 2-3 stage speed change valve 68 by means of the spring 79. The object of the throttle reducing valve 56 is to reduce the throttle pressure by a certain value.

In operation, the throttle pressure is applied to the left hand end of the spool 57 of the reducing valve 56 to move the spool 57 rightwards to communicate the passage 54 with the passage 58. The pressure on the passage 58 is also delivered to the right hand end of the spool 57 through a valve port 58a so as to urge the spool 57 leftwards. Moreover, the spring 79 of the 2-3 stage speed change valve 68 is engaged with the spool 57 of the throttle reducing valve 56 to urge the spool 57 leftwards. If it is assumed that the throttle pressure, the reduced throttle pressure, the area of the spool, and the spring force are respectively represented by $P_{TH}$, $P_{TH'}$, A, and F, then there are following relations among such quantities.

$$P_{TH} \times A = P_{TH'} \times A + F$$

$$P_{TH} - P_{RH'} = F/A$$

Thus, the reduced throttle pressure $P_{TH'}$ is smaller than the throttle pressure $P_{TH}$ by a certain value represented by $F/A$, and the reduced throttle pressure is applied to the spool 73 of the 1-2 stage speed change valve 59.

(9) Down-shift valve 40

The down-shift valve 40 is to provide a suitable duration of neutral interval for 3-2 down-shift operation responsive to the vacuum throttle pressure and the governor pressure. The down-shift valve 40 is essentially a one-way valve inserted between the passages 80 and 83b (or 83c) so as to allow the fluid passage from passage 80 to the passage 83b (or 83c) substantially without any resistance, while presenting a variable resistance against fluid flow from the passage 83b (or 83c) to the passage 80. The magnitude of the variable resistance depends on the automobile speed and the engine torque.

As regards the fluid flow from passage 80 to the passage 83b (or 83c), the fluid passes through the one-way-check ball valve 81 and further passes through the down-shift valve 40 at the intermediate space between the two lands of the spool 84 thereof substantially without any resistance.

For the fluid flow from the passage 83b (or 83c) to the passage 80, the one-way-check ball valve 81 acts to block such fluid flow. However, due to the difference in the cross sectional area between the extreme left end land 84a and the land 84b next to the extreme left of the spool 84 of the down-shift valve 40, the fluid pressure applied to the intermediate space between the aforesaid two lands acts to move the spool 84 rightwards. Thus, the fluid pressure on the passage 83b (or 83c) is communicated with the passage 80 through another intermediate space between the second land 84b and the third land 84c from the extreme left end of the spool 84. However, the fluid pressure on the passage 80 is applied to the space between the third land 84c and the fourth land 84d, and there are following relations among the fluid pressure $P_1$ on the passage 83b (or 83c), the fluid pressure $P_2$ on the passage 80, the differential area $A_1$ between the first land 84a and the second land 84b of the spool 84, another differential area $A_2$ between the third land 84c and the fourth land 84d of the spool 84, and the elastic force F of the spring 85.

$$A_1 P_1 = A_2 P_2 + F$$

Assuming $A_1 = A_2 = A$, one obtains the following relation.

$$P_1 - P_2 = F/A$$

Thus, it is apparent that the differential pressure between the passage 83b (or 83c) and 80 is of a constant value depending on the elastic force of the spring 85. The governor pressure $P_G$ is also applied to this down-shift valve at the right hand end thereof through the passage 43 thereof, so that when the automobile speed is high to cause a high governor pressure, then the apparent elastic force of the spring 85 is increased, and the pressure difference between $P_1$ and $P_2$ is increased too.

The vacuum throttle pressure is applied to the left hand end of the down-shift valve 40 through the passage 38, so that when the engine torque is small the apparent elastic force of the spring 85 is increased to increase the pressure difference between $P_1$ and $P_2$. In other words, when the fluid pressure in the passage 80 is reduced, the fluid pressure on the passage 83b (or 83c) can be retained at a high level, provided that the automobile speed is high or the engine torque is low. Thus, the duration of the neutral interval can be determined properly.

Salient features of the automatic speed change device of the present invention are as follows.

(1) With the speed change device of the invention, it is made possible to change the travelling speed of an automobile equipped with the device in four stages for forward movement and in a single stage for rearward movement. Thereby, speed change operation can be carried out while keeping the torque ratio of a torque converter within an optimum efficiency range thereof for maintaining the maximum efficiency of power transmission regardless of the revolving speed of an output shaft thereof. Moreover, the speed change operation can be carried out in a very smooth manner.

(2) It is made possible to materialize so-called over drive (or increased speed) at the forward fourth stage of the speed change device of the invention.

(3) With the speed change device of the invention, it is made possible to assign various speed change ratios selectively to each speed change stage thereof by selecting proper number of teeth for each gear being used in the device.

Therefore, the four stage automatic speed change device of the invention can be applied with great advantages to a passenger car, a truck, a bus, and other similar machinery.

(4) With the hydraulic control device according to the present invention, the line pressure therein can be selected at the most suitable level for each operative stage of the speed change device. The line pressure is controlled by the combination of a vacuum throttle pressure responsive to the loading condition of the engine, a governor pressure responsive to the automobile speed, and a controlled pressure responsive to the operative conditions of the brake $B_2$ and the clutch $C_2$.

(5) A down-shift valve provided in the hydraulic control device according to the present invention acts to ensure proper duration of neutral interval for each down-shift operation by controlling the duration of the neutral interval responsive to the vacuum throttle pressure determined by the loading condition and the governor pressure determined by the automobile speed.

(6) The fluid pressure applied to each frictional element is selected in a pularity of steps by means of a line pressure regulating valve associated with a line pressure intensifying valve so as to apply the most suitable fluid pressure for each running condition of the automobile.

(7) In the hydraulic control device according to the present invention, there is provided a vacuum valve to be controlled by a diaphragm responsive to the vacuum pressure at the engine intake manifold, and the vacuum throttle pressure in the hydraulic control device is varied responsive to the aforesaid vacuum pressure.

(8) There is provided a throttle valve in the hydraulic control device according to the present invention, which is associated with a kick-down valve and a spring. Thereby, the hydraulic control device can be regulated delicately by controlling the throttle valve output pressure responsive to the degree of opening of the accelerator pedal.

While the present invention has been described in connection with preferred embodiments thereof, it should be understood that various changes and modifications can be made therein by those skilled in the art without departing from the scope of the invention. It is aimed, therefore, to cover in the appended claims all such changes and modifications within the true spirit and scope of the invention.

What is claimed is:

1. A hydraulically controlled automatic speed change device, comprising a casing having first and second brakes mounted thereon, an input shaft rotatable only in one direction, an output shaft means, an intermediate shaft shaft means disposed between said input shaft and said output shaft means, a torque converter having a pump connected to said input shaft and a turbine connected through a shaft means to a clutch assembly including a forward and a rearward clutch, a planetary gear assembly, a direct connection clutch inserted between said torque converter and one end of said intermediate shaft means, said planetary gear assembly consisting of a first sun gear connected to a shaft engageable with said turbine through said rearward clutch and with said second brake, a second sun gear connected to a shaft engageable with said turbine through said forward clutch, a plurality of first planet gears engaged with said first sun gear, a plurality of second planet gears each engaged with one of said first planet gears and with said second sun gear, an internal gear connected to said output shaft means and engaged with said first planet gears, a carrier holding said first and second planet gears in a rotatable manner, a sleeve integrally secured to said casing, a bearing means combined with a one-way brake, both carried by said sleeve so as to be rotatable only in said one direction, said carrier connected integrally to the opposite end of said intermediate shaft means and supported by said bearing means combined with one-way brake, and a hydraulic control means adapted to selectively actuate said clutches and said brakes.

2. A hydraulically controlled automatic speed change device comprising a casing having first and second brakes mounted thereon, an input shaft rotatable only in one direction, an output shaft means, an intermediate shaft means disposed between said input shaft and said output means, a torque converter having a pump connected to said input shaft and a turbine connected through a shaft means to a clutch assembly including a forward and a rearward clutch, a planetary gear assembly, a direct connection clutch inserted between said pump of said torque converter and one end of said intermediate shaft means, said planeary gear assembly consisting of a first sun gear connected to a shaft engageable with said turbine through said rearward clutch and with said second brake, a second sun gear connected to a shaft engageable with said turbine through said forward clutch, a plurality of first planet gears engaged with said first sun gear, a plurality of second planet gears each engaged with one of said first planet gears and with said second sun gear, an internal gear connected to said output shaft means and engaged with said first planet gears, a carrier holding said first and second planet gears in a rotatable manner, a sleeve integrally secured to said casing, a bearing means combined with a one-way brake both carried by said sleeve so as to be rotatable only in said one direction, said carrier connected integrally to the opposite end of said intermediate shaft means and supported by said bearing means combined with said one-way brake, and a hydraulic control means adapted to selectively actuate said clutches and said brakes.

3. A hydraulically controlled automatic speed change device comprising a casing having first and second brakes mounted thereon, an input shaft rotatable only in one direction, an output shaft means, an intermediate shaft means disposed between said input shaft and said output shaft means, a torque converter having a pump connected to said input shaft and a turbine connected through a shaft means to a clutch assembly including a forward and a rearward clutch, a planetary gear assembly, a direct connection clutch inserted between said turbine of said toroque converter and one end of said intermediate shaft means, said planetary gear assembly consisting of a first sun gear connected to a shaft engageable with said turbine through the rearward clutch and with said second brake, a second sun gear connected to a shaft engageable with said turbine through the forward clutch, a plurality of first planet gears engaged with said first sun gear, a plurality of second planet gears each engaged with one of said first planet gears and with said second sun gear, an internal gear connected to said output shaft means an engaged with said first planet gears, and a carrier holding said first and second planet gears in a rotatable manner, a sleeve integrally secured to said casing, a bearing means combined with a one-way brake both carried by said sleeve so as to be rotatable only in said one direction, said carrier connected integrally to the opposite end of said intermediate shaft means and supported by said bearing means combined with said one-way brake, and a hydraulic control means adapted to selectively actuate said clutches and said brakes.

4. A speed change device according to claim 1 wherein the number of said first planet gears is at least two.

5. A speed change device according to claim 1 and further comprising a first tubular shaft extending coaxially around said intermediate shaft from said forward clutch to said second sun gear, and a second tubular shaft extending coaxially around said first tubular shaft from said rearward clutch to said first sun gear.

6. A speed change device according to claim 1, wherein said intermediate shaft is axially aligned with both said input shaft and said output shaft means.

7. A hydraulic control means for an automatic speed change device incorporating a plurality of brakes and clutches, said control means comprising fluid passage means; a fluid pump connected to said fluid passage means, said fluid pump supplying hydraulic fluid under pressure to said pasage means; a line pressure regulating valve connected in said passage means for regulating the pressure of said hydraulic fluid; a governor valve means operated by the output shaft of said speed change device and being connected with said fluid passage means for generating a governor pressure in response to the revolving speed of said output shaft; a modulator valve operatively combined with the output pressure from said line pressure regulating valve; speed change valve means connected with said passage means for selectively engaging and disengaging said brakes and clutches to obtain a plurality of speed gear ratios; a down-shift valve operatively connected in said fluid passage means; a hydraulic passage connecting said speed change valve means with said down-shift valve; a check valve means located in said hydraulic passage to allow fluid flow from said speed change valve means to said down-shift valve and blocking flow of said hydraulic fluid in the opposite direction; an orifice operatively connected in parallel flow relation with said check valve means; and a vacuum valve connected in said fluid passage means for producing a throttle pressure in response to negative pressure at an engine intake manifold; said governor pressure and said line pressure acting on said speed change valve means to actuate said brakes and clutches, and said down-shift valve controlled by said governor pressure and said throttle pressure so as to cause hydraulic fluid to pass through said orifice under conditions determined by said throttle pressure and said governor pressure, so as to provide a neutral interval of a certain predetermined duration during the gear shift operation.

References Cited

UNITED STATES PATENTS

| | | | |
|---|---|---|---|
| 2,821,867 | 2/1958 | Kelbel | 74—688 |
| 3,132,530 | 5/1964 | Le Brise | 192—3.33 XR |
| 3,401,581 | 9/1968 | Chana | 74—864 |
| 2,932,990 | 4/1960 | Cartwright et al. | 74—763 |
| 3,025,723 | 3/1962 | Miller | 74—754 X |
| 3,314,307 | 4/1967 | Egbert | 74—688 |
| 3,336,815 | 8/1967 | Leonard | 74—869 X |
| 3,369,430 | 2/1968 | Haley | 74—752 |

ARTHUR T. McKEON, Primary Examiner

U.S. Cl. X.R.

74—763, 867